Patented May 19, 1942

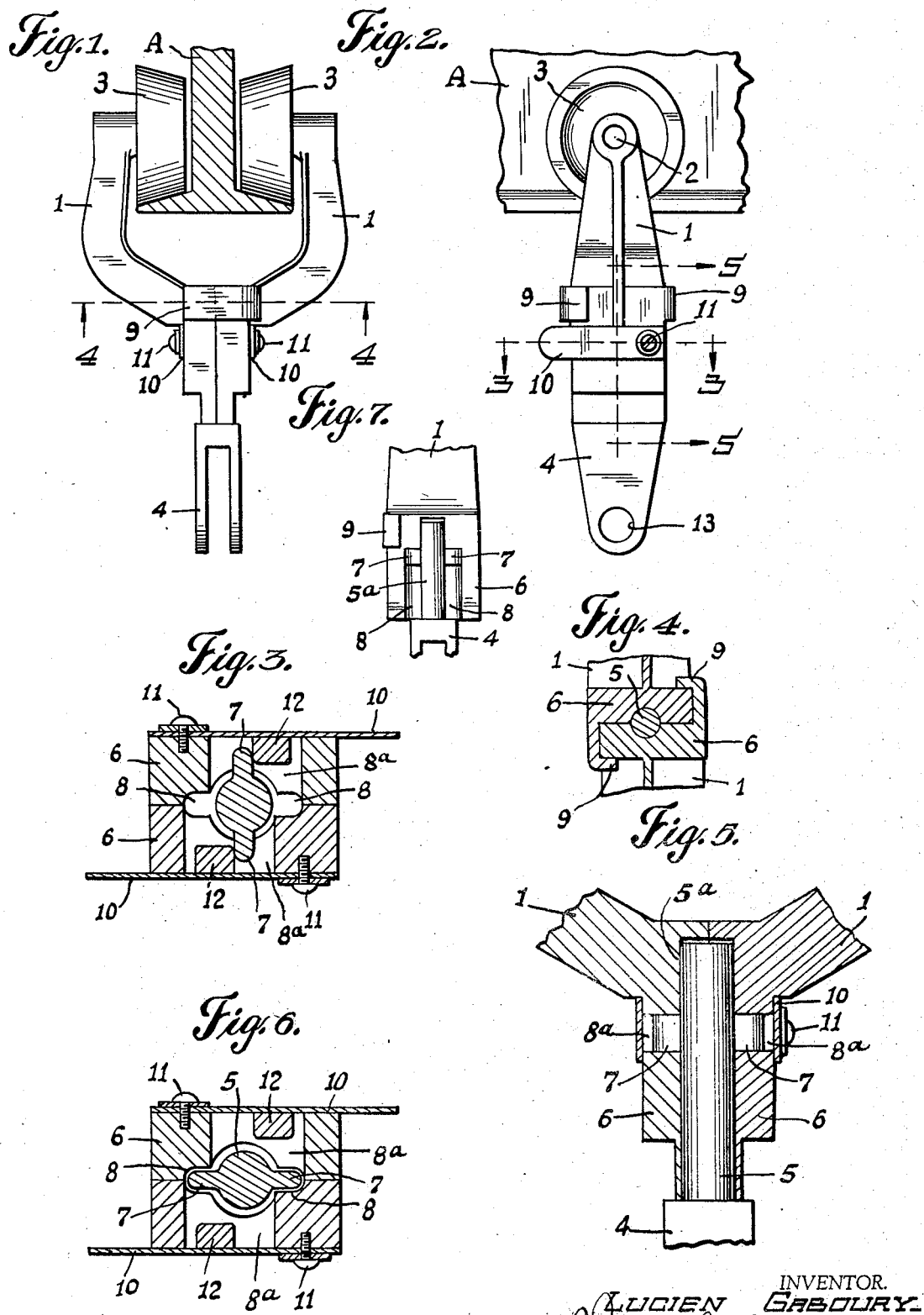

2,283,359

UNITED STATES PATENT OFFICE 2,283,359

OVERHEAD CONVEYER TROLLEY

Lucien Gaboury, Detroit, Mich., assignor to Jervis B. Webb Company, Detroit, Mich.

Application April 20, 1939, Serial No. 269,039

6 Claims. (Cl. 198—177)

This invention relates to improvements in trolleys adapted for overhead conveyers and is particularly concerned with the several parts forming the trolley bracket which carries the wheels of the trolley together with the downwardly projecting support member for connecting the trolley with the load or the conveyer chain.

It is a primary object of the present invention to provide trolley bracket parts of such construction as to enable such parts to be positively secured together with a minimum number of special fastenings and to enable such parts to be assembled and disassembled quickly and easily.

The above and other objects of the invention will appear more fully from the following description and by reference to the accompanying drawing forming a part hereof and wherein:

Fig. 1 is an end view showing a section through the track and showing also the several parts of the trolley bracket and the yoke support member for the chain or load in assembled position for support on a track.

Fig. 2 is a side view of the same structure shown in Fig. 1.

Fig. 3 is a section taken on the line 3—3 of Fig. 2 and shows the parts in their assembled locked position.

Fig. 4 is a section taken on the line 4—4 of Fig. 1 and shows the means securing the two block portions of the trolley brackets together.

Fig. 5 is a section taken on the line 5—5 of Fig. 2.

Fig. 6 is a section similar to Fig. 3 but showing the parts in an unlocked position ready for disassembly.

Fig. 7 is a view showing the inner contacting surface of a block of one of the bracket members with the adjacent bracket member removed.

Referring to the drawing, overhead track A, shown in Figs. 1 and 2, carries a trolley having two brackets 1, 1, on each of which is mounted a trolley wheel 3 on a shaft 2 carried by the bracket 1. The trolley is of the type using trolley wheels on opposite sides of a track as shown in Fig. 1 and the two brackets 1, 1, must therefore be secured together at their lower ends and also have secured thereto a downwardly extending member, such as a yoke member 4, for the support of a chain or other load.

The means employed for accomplishing the fastening of the two brackets 1, 1 and the yoke member 4 together in a unitary structure which can be easily and quickly assembled and disassembled is an important feature of the present invention. This construction will be apparent on consideration of Figs. 1 and 2 together with the Figs. 3, 4, 5, 6 and 7. The lower portions of the brackets 1, 1, have blocks 6 which fit together and are so formed as to provide a socket 5a between the blocks surrounding an upwardly projecting shank 5 of the yoke member 4. The socket is formed by complementary grooves in the surfaces of blocks 6, as shown by Figs. 4, 5 and 7, and in addition having formed therein further complementary recesses at the edge of the grooves which, when the two blocks 6 are placed together, form slots 8 which extend up into transverse recesses 8a cut in each of the blocks positioned to receive laterally extending lugs 7 formed on the shank 5. As will be noted in Figs. 3 and 6, the walls of these transverse recesses 8a are so positioned that one wall is positioned near the inner end of one slot and the opposite wall in the same block is positioned near the outer end of the opposite slot. The opposite transverse recess 8a, however, has walls formed in the opposite manner as shown in Figs. 3 and 6.

Each of the blocks 6 has a hook portion 9 preferably formed integral therewith and so shaped that the opposite block is retained from separation when the two blocks are placed in the position shown in Fig. 4.

Flat springs 10 are provided, one spring detachably secured to the outside of each of the blocks 6 by means of a screw 11 in position to substantially cover the outer openings of transverse recesses 8a. Each of the springs 10 has a lug 12 secured thereto, which lug extends inwardly into transverse recess 8a as shown in Figs. 3 and 6.

When assembling the trolley, the two brackets 1, 1, may first be placed together with the blocks 6 interlocked with the hooks 9. In such position the hooks 9 will retain the blocks 6 from movement out of the plane determined by the contact of the inner surfaces of the blocks 6. The upwardly extending shaft 5 of the member 4 may then be inserted in and pushed upwardly thru the socket 5a until the lugs 7 are in the position shown in Fig. 6 with the shaft 5 pushed upwardly a sufficient amount for the lugs 7 to be positioned opposite the transverse recesses 8a, the shaft 5 of the member 4 being turned in a counterclockwise direction, as viewed in Fig. 6, thus moving each of the lugs 7 out into the adjacent transverse recess 8a. The lugs 7 on the shaft 5 then contact the lugs 12 on the springs 10, and as the shaft is turned further, the spring action of the springs 10 will allow each of the lugs 12 to be pushed outwardly. When the shaft has reached a position substantially as shown in Fig. 3, the lugs 12 and springs 10 will spring back into the position shown in Fig. 3, thereby locking the lugs 7 and the shaft 5 against clockwise movement. As the structure is shown in Figs. 3 and 6, the walls of each transverse recess 8a are positioned, as previously described, so that a limited further counter-clockwise rotation of the shaft 5 is possible. However, as will be noted on reference to Figs. 3 and 6, this rotation cannot be sufficient to allow the lugs 7 to become aligned with the slots 8. It is apparent that the three parts, i. e. brackets 1, 1, and the yoke member 4 are now securely fastened together and can only be disassembled by rotating the shaft 5 in a clockwise direction as viewed in Figs. 3 and 6 to again bring the lugs 7 into alignment with the slots 8 and thus to allow the shaft 5 to be removed downwardly. In order to accomplish this disassembly, the springs 10 may be pushed outwardly by any suitable instrument or tool which will contact the outer projecting ends of the springs 10, thereby moving the lugs 12 outwardly a sufficient amount to allow the lugs 7 to pass.

It is noted that the insertion of the shaft 5 in the socket 5a and the subsequent turning of the lugs 7 into the transverse recesses 8a completes a locking of the trolley brackets together. There might be said to be three steps necessary to complete the locking of the parts, i. e. (1) the assembly of the blocks 6 with their inner faces in contact and engaged by the hooks 9, thus retaining the blocks 6 against movement out of the plane defined by contact of the inner surfaces of blocks 6; (2) insertion of shaft 5 in socket 5a which further retains the blocks against relative lateral sliding movement; (3) and finally rotating shaft 5 to move lugs 7 into transverse recesses 8a, thus preventing relative vertical sliding movement of the blocks and completely locking them against movement in all directions.

Although the invention has been described by reference to a specific structure found practical in actual use, it is understood that certain changes may be made without departing from the fundamental principle of construction and within the scope of the following claims.

Having thus fully described my invention, what I claim as new is:

1. A trolley having in combination a pair of brackets, lower block portions of said brackets having surfaces adapted to fit together, members secured to and engaging said block portions and allowing sliding movement on said surfaces to bring said members into and out of engagement but retaining said block portions against movement out of a plane defined by sliding contact of said surfaces of said blocks, a load carrying member formed to interlock with said block portions to prevent relative sliding movement of said block portions.

2. A trolley having in combination a pair of brackets, lower block portions of said brackets having surfaces adapted to fit together, members retaining said block portions against movement out of a plane defined by sliding contact of said surfaces of said blocks, said blocks having portions thereof formed to shape a socket with cylindrical and transverse recess portions when said surfaces are in contact, a supporting yoke member and a shaft therefor, said shaft preventing relative movement between said brackets when said shaft is inserted in said socket.

3. A trolley having in combination a pair of brackets, lower portions of said brackets having surfaces adapted to fit together, members retaining said block portions against movement out of a plane defined by sliding contact of said surfaces of said blocks, said blocks having portions thereof formed to shape a socket when said surfaces are in contact and with a substantially lower portion with transverse recesses extending therefrom, a supporting yoke member and a shaft therefor having laterally extending lugs thereon, said shaft and lugs preventing relative movement between said blocks when said shaft is inserted in said socket and when said lugs are positioned in said transverse recesses.

4. A trolley having in combination a pair of brackets, portions of said brackets having surfaces adapted to fit together, members formed and positioned to engage said brackets on relative sliding movement of said brackets on said surfaces and to retain the surfaces of said block members in contact, a load carrying member having a portion adapted to be subsequently positioned and retained by said block members to prevent relative sliding movement of said block members on said surfaces, thereby to secure said brackets and said support member together.

5. A trolley having in combination a pair of brackets, lower portions of said brackets having surfaces adapted to fit together and formed portions adjacent said surfaces forming a socket with a portion of said socket with transverse recess portions in each of said blocks when the surfaces of said blocks are in contact, a load carrying member having a projecting portion adapted to be seated in said transverse recess portions of said socket thereby preventing relative sliding movement of said blocks on said surfaces.

6. A trolley having in combination a pair of brackets, lower portions of said brackets having surfaces adapted to fit together and formed portions adjacent said surfaces forming a longitudinally extending socket of substantially circular cross section terminating in a transverse recess having a complementary part in each of said blocks and further cut out portions adjacent said longitudinally extending socket forming complementary portions of a slot when said surfaces are in contact, a support member having a longitudinally extending shaft of circular cross section adapted to be inserted in said socket, a lug on said shaft adapted to slide in said slot and to turn into said transverse recess whereby said support member is secured to said brackets and said blocks are prevented from relative sliding movement by said lug and shaft of said support member.

LUCIEN GABOURY.